United States Patent
Shuma et al.

(10) Patent No.: US 7,519,637 B2
(45) Date of Patent: Apr. 14, 2009

(54) SYSTEM AND METHOD FOR REORGANIZING A DATABASE

(75) Inventors: Kevin P. Shuma, Celina, TX (US); Joseph B. Lynn, Plano, TX (US)

(73) Assignee: Computer Associates Think, Inc., Islandia, NY (US)

(*) Notice: Subject to any disclaimer, the term of this patent is extended or adjusted under 35 U.S.C. 154(b) by 287 days.

(21) Appl. No.: 11/125,377

(22) Filed: May 9, 2005

(65) Prior Publication Data
US 2006/0036618 A1  Feb. 16, 2006

Related U.S. Application Data

(60) Provisional application No. 60/601,380, filed on Aug. 13, 2004.

(51) Int. Cl.
*G06F 17/30* (2006.01)
(52) U.S. Cl. .......... 707/205; 711/165
(58) Field of Classification Search .......... 707/200, 707/205, 206; 711/112, 165, 167
See application file for complete search history.

(56) References Cited

U.S. PATENT DOCUMENTS

| | | | |
|---|---|---|---|
| 5,596,747 A * | 1/1997 | Katabami et al. | 707/101 |
| 6,070,170 A | 5/2000 | Friske et al. | |
| 6,122,640 A * | 9/2000 | Pereira | 707/103 R |
| 6,144,970 A * | 11/2000 | Bonner et al. | 707/206 |
| 6,223,182 B1 | 4/2001 | Agarwal et al. | 707/102 |
| 6,343,296 B1 | 1/2002 | Lakhamraju et al. | |
| 6,349,310 B1 * | 2/2002 | Klein et al. | 707/200 |
| 6,411,964 B1 * | 6/2002 | Iyer et al. | 707/200 |
| 6,519,613 B1 | 2/2003 | Friske et al. | |
| 6,535,893 B1 | 3/2003 | Friske et al. | |
| 6,535,895 B2 | 3/2003 | Bonner et al. | |
| 6,606,626 B1 | 8/2003 | Ponnekanti | 707/8 |
| 2001/0047360 A1 | 11/2001 | Huras et al. | |
| 2003/0135478 A1 | 7/2003 | Marshall et al. | |

* cited by examiner

*Primary Examiner*—Leslie Wong
(74) *Attorney, Agent, or Firm*—Pillsbury Winthrop Shaw Pittman LLP

(57) ABSTRACT

A method and system presents an online reorganization of at least a portion of a database. The database includes a plurality of rows stored in a plurality of physical blocks and the rows are categorized by a plurality of reference groups. The database manager is operable to identify a target subset of physical blocks based, at least in part, on one of the reference groups and to identify a source subset of physical blocks associated with the particular reference group. The database manager is further operable to dynamically move the rows stored in a first physical block in the source subset to a second physical block in the target subset while the database is online.

26 Claims, 3 Drawing Sheets

FIG. 3

| RFG# | RANGE | ROWS | ROW/BLK | BLKS | 1ROW | 2ROW | 3ROW | 4ROW | 5ROW | 6ROW | 7ROW | 8ROW | 9ROW | 10ROW | 10RW 10+ | 15+ | 20+ | 25+ | 30+ | 35+ | 40+ | 45+ | 50+ | 100+ |
|---|---|---|---|---|---|---|---|---|---|---|---|---|---|---|---|---|---|---|---|---|---|---|---|---|
| 000001 | 1-301 | 0301 | 0043 | 000007 | 1 | | | | | | | | | | | | | | | | | | | |
| 000002 | 302-602 | 0301 | 0033 | 000009 | 2 | | | | | | | | | | | | | | | | | | | |
| 000003 | 603-904 | 0302 | 0034 | 000009 | 2 | | | | | | | | | | | | | | | | | | | |
| 000004 | 905-1206 | 0302 | 0018 | 000017 | 1 | | | | | | | | | | | | | | | | | | | |
| 000005 | 1207-1507 | 0301 | 0017 | 000018 | 1 | | | | | | | | | | | | | | | | | | | |
| 000006 | 1508-1808 | 0301 | 0016 | 000019 | 2 | | | | | | | | | | | | | | | | | | | |
| 000007 | 1809-2109 | 0301 | 0016 | 000019 | 1 | | | | | | | | | | | | | | | | | | | |
| 000008 | 2110-2410 | 0301 | 0017 | 000018 | 1 | | | | | | | | | | | | | | | | | | | |
| 000009 | 2411-2711 | 0301 | 0015 | 000020 | 1 | | | 1 | | | | | | | | | | | | | | | | |
| 000010 | 2712-3012 | 0301 | 0015 | 000020 | 1 | | | | | | | | | | | | | | | | | | | |
| 000011 | 3013-3313 | 0301 | 0016 | 000019 | 1 | | | | 2 | | | | | | | | | | | | | | | |
| 000012 | 3314-3614 | 0301 | 0015 | 000020 | 1 | | | | | 1 | | | | | | | | | | | | | | |
| 000013 | 3615-3915 | 0301 | 0015 | 000020 | 1 | | | | | 1 | | | | | | | | | | | | | | |
| 000014 | 3916-4216 | 0301 | 0002 | 000156 | 69 | | | | | | | | | | 13 | | | | | | | | | |
| 000015 | 4217-4517 | 0301 | 0002 | 000151 | 1 | 85 | | | | | | | | | 17 | | | | | | | | | |
| 000016 | 4518-4818 | 0301 | 0002 | 000151 | 1 | 150 | | | | | | | | | 16 | | | | | | | | | |
| 000017 | 4819-5119 | 0301 | 0002 | 000151 | 1 | 150 | | | | | | | | 1 | | 17 | | | | | | | | |
| 000018 | 5120-5420 | 0301 | 0002 | 000151 | 1 | 150 | | | | | | | | | 16 | | | 2 | | | | | | |
| 000019 | 5421-5721 | 0301 | 0002 | 000151 | 1 | 150 | | | | | | | | | | 17 | | | | | | | | |
| 000020 | 5722-6022 | 0301 | 0002 | 000151 | 1 | 150 | | | | | | | | | | 17 | | | | | | | | |
| ... | | | | | | | | | | | | | | | | | | | | | | | | |
| 000033 | 9635-9935 | 0301 | 0002 | 000151 | 1 | 150 | | | | | | | | | | 17 | | | | | | | 7 | |
| TOTALS | | 009935 | 000262 | | 100 | 2936 | 1 | 2 | 2 | 2 | 1 | 1 | 1 | 8 | 163 | 1 | 2 | | | | | 18 | 1 | |

AVG ROWS PER BLOCK: 37.91
AVG RFG ROWS/BLOCK: 9.39

SYSTEM AND METHOD FOR REORGANIZING A DATABASE

RELATED APPLICATION

This application claims the priority under 35 U.S.C. §119 of provisional application Ser. No. 60/601,380 filed Aug. 13, 2004.

TECHNICAL FIELD

This disclosure generally relates to database management and, more specifically, to a system and method for reorganizing a database.

BACKGROUND

For performance reasons, many relational database management systems (RDBMS) allow users an option to physically store data rows in a random fashion. When data is stored randomly, space may be used as it becomes available, allowing data to be stored quickly and deleted space to be reused automatically. But because storage is random, it may be more resource intensive to search and retrieve information than it would be if information were stored according to a predetermined sequence. As more and more data rows are stored "out of order" from the sequence, accessing information in the database, particularly batch sequential processes reading large segments of the database, may increasingly tax system resources and buffering ability. For this reason, most RDBMSs also provide the ability for reorganization that reorganizes the database according to a particular order, which is known as a "native key sequence." During reorganization, the database is taken offline (made unavailable to users). In large databases, the time offline required for reorganization can require a significant amount of time and can produce a noticeable interruption in user access. Some existing database products may offer the ability to re-sequence their data rows into correct "key" sequence while the database is still available to user access. This re-sequencing of data rows while the database table is still available for user access is commonly known as an "online reorganization". These online reorganizations typically read and move every row in the database table and are resource intensive.

SUMMARY

This disclosure provides a system and method for reorganizing a database. In one embodiment, software for reorganizing at least a portion of a database resides on a computer-readable medium. The portion of the database comprises a plurality of rows stored in a plurality of physical blocks and the rows are categorized by a plurality of reference groups. The example software is operable to identify a target subset of physical blocks based, at least in part, on one of the reference groups and to identify a source subset of physical blocks associated with the particular reference group. The software is further operable to dynamically move the rows stored in a first physical block in the source subset to a second physical block in the target subset while the database is online. The details of one or more embodiments of the disclosure are set forth in the accompanying drawings and the description below. Particular features, objects, and advantages of the disclosure will be apparent from the description and drawings and from the claims.

DESCRIPTION OF DRAWINGS

FIG. 3 illustrates a sample report useable to analyze the degree of contamination from a native sequence in a series of reference groups.

DETAILED DESCRIPTION

Figure 1:
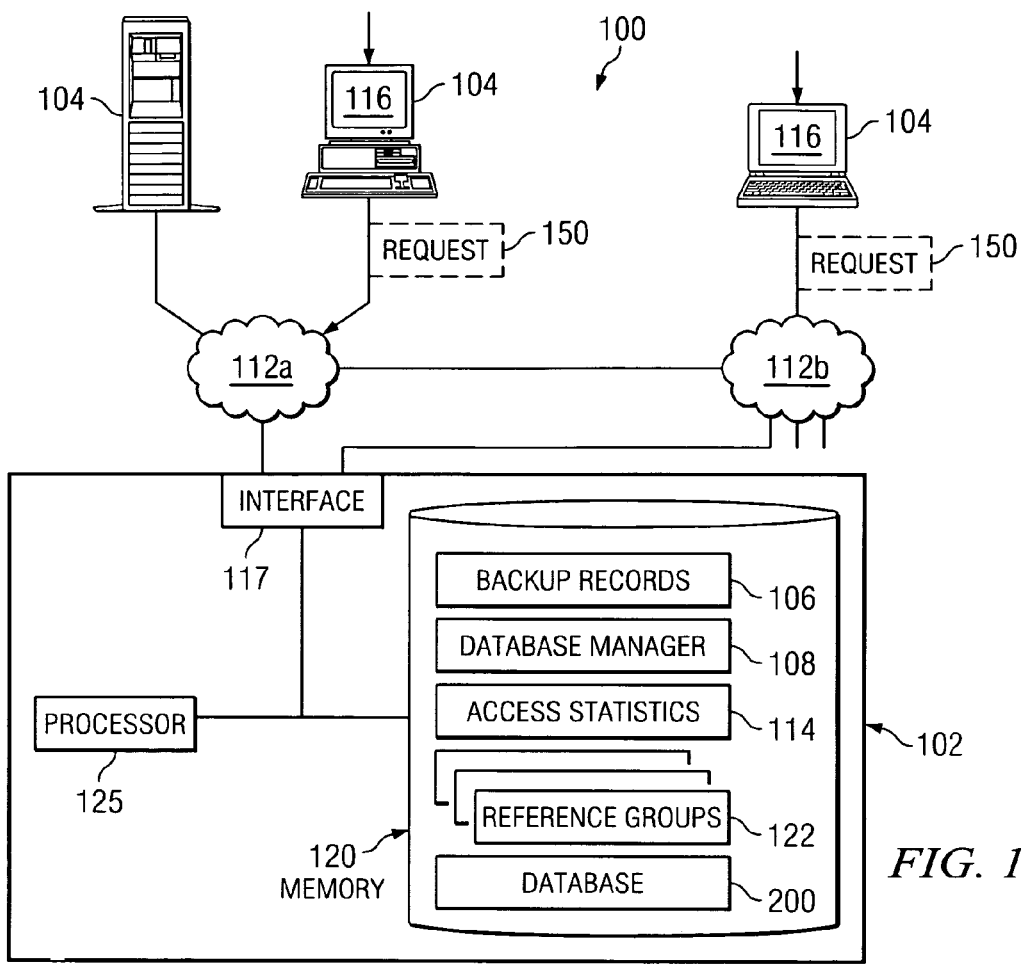
FIG. 1 illustrates a database environment implementing database reorganization techniques according to a particular implementation of the present invention.

FIG. 1 illustrates a relational database environment 100 for storing and retrieving information in at least a portion of enterprise or data processing environment in accordance with a particular implementation of a system and method for reorganizing a database 200. At a high level, environment 100 automatically (or based on a request from user) reorganizes a subset of database 200 using one or more reference groups. For example, a user may determine that a portion of a keyset should be reorganized. Based on this determination, environment 100 performs a reference group online registration. More specifically, environment 100 identifies a particular reference group and determines what physical data blocks contain or reference these rows. It may then analyze these blocks and move rows from "low-use" blocks to "high-use" blocks. In certain embodiments, the outcome will be a smaller set of physical blocks that hold all of the data rows. This reduction in the number of physical blocks associated with the particular reference group often results in a performance improvement. Put another way, this movement of data rows to improve physical sequence of the rows may improve performance and reduce resource utilization. Once this reference group reorganization is completed, environment 100 may identify the next group (if any) for reorganization. This reference group reorganization may take less resources to complete than a full reorganization, while providing many if not all of the same benefits of the re-sequencing of the full reorganization. Moreover, a reference group reorganization may be able to greatly extend or ignore the time intervals between full reorganizations. In other words, environment 100 allows reorganization of information stored in database 200 according to a native key sequence or reference group. "Key sequence" normally refers to a particular arrangement of index values ("keys") associated with rows in a database, as described in greater detail below.

In a relational database, large amounts of data may be stored in rows within a table or in other data formats or structures. As used herein, the term "row" refers to any manner of indexed database record stored in any data format or structure, including but not limited to rows in a tabular format. Rows may be indexed according to one or more keys, allowing rows to be accessed using one or more index paths. The order of keys in a particular index is the called the "key sequence" for that particular index. One of these indices may be selected to correspond to the physical storage order of the data in order to facilitate retrieval from memory 120. Such an index is normally referred to as a "native key sequence" and it is used when the entire content of the database or some significant portion thereof is accessed in a sequential process.

This type of organization allows groups of sequenced rows to be accessed using the native key sequence, which facilitates batch processing of rows. As rows are added and deleted in database 200 and physical blocks within memory 120 (known as the "data space") are reused, the order of the rows in memory 120 may deviate from the native key sequence, resulting in "contamination" or "corruption" of the native key sequence. This results from a variety of different techniques for allocating new rows to physical blocks in memory 120 designated for database use (also known as the "data space"). Such techniques are sometimes called "data space options" (DSOPs). Examples of DSOPs include "no reuse" (new rows are appended at the end of previously-written rows and erased blocks are not reused), "random" (rows may be inserted into any available space), "wrap" (rows are added to the end of previously-written rows, but when the end of the data block is reached, unused space at the beginning may be written), "clustered" (data blocks are assigned to portions of the native key sequence, only entries in that portion may be written to the block, and a new block is assigned to the sequence when the current block is filled).

As the order of rows in database 200 becomes more contaminated or inefficient, the average amount of information responsive to a query that will be retrieved by each access to a physical data block (known as a "physical IO") may tend to drop. For example, if there are 20 rows stored in each physical block and database 200 is organized perfectly according to the native key sequence, then a query based on the native key sequence can in principle return 20 rows per physical IO. But if rows are stored randomly among physical blocks, the average amount of responsive information retrieved may be as low as one row per physical IO. Accordingly, the average performance of the database 200 may decline as the order of rows in database 200 becomes contaminated. In short, various implementations of techniques for database reorganization in this disclosure provide selective database reorganization without requiring the entire database to be rendered unavailable.

Environment 100 may be a distributed client/server system that allows users of clients 104 to submit requests to store and/or retrieve information from database 200 maintained on server 102. But environment 100 may also be a standalone computing environment or any other suitable environment, such as an administrator accessing data stored on server 102, without departing from the scope of this disclosure. Environment 100 may allow access to database 200 using a structured query language (SQL), which may include any of the plurality of versions of the SQL relational database query and manipulation language such as, for example, SEQUEL, ANSI SQL, any other proprietary or public variant of SQL, or other suitable or generic database query language (XML). In the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 200, backup records 106 (which may also be stored on a remote disk or tape), and a database manager 108, which may be any set of logical instructions executed by processor 125 to perform tasks associated with database management and/or responding to queries, including storing information in memory 120, searching database 200, generating responses to queries using information in database 200, restoring portions of database 200 from backup records 106, and numerous other related tasks. In particular embodiments, database manager 108 accesses statistics 114 about the number and type of database accesses in response to queries from clients 104. For example, database manager 108 may monitor the number of sequential accesses to information requested to detect areas in which efficiency might be improved by having rows arranged according to the native key sequence or other selected sequence. Database manager 108 may also monitor the number of accesses to non-contiguous data blocks performed in response to queries to detect indexed rows in which significant numbers of rows are out of key sequence. To facilitate this process, rows may be organized into references groups 122 corresponding to portions of a particular key sequence. Thus, for example, statistics 114 may track a rating for how often each reference group 122 is being accessed and how efficiently each group 122 is being accessed in terms of rows retrieved per physical IO. In another example, reference groups 122 may be monitored as new rows within each reference group 122 are added to the degree to which the key sequence of that group 122 has been contaminated. Database manager 108 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. It will be understood that while database manager 108 is illustrated in FIG. 1 as a single multi-tasked module, the features and functionality performed by this engine may be performed by multiple modules such as, for example, one or more agents or database instances. Further, while illustrated as internal to server 102, one or more processes associated with database manager 108 may be stored, referenced, or executed remotely. Moreover, database manager 108 may be a child or sub-module of another software module (not illustrated) without departing from the scope of this disclosure. In one embodiment, database manager 108 may be referenced by or communicably coupled with applications executing on client 104.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with database manager 108. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain embodiments, server 102 receives requests 150 from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. For example, GUI 116 may be a front-end of an application executing on client 104 that is operable to submit SQL queries 150 to one or more databases 200. In another example, GUI 116 may display output reports such as summary and detailed reports. In yet another example, GUI 116 may allow the user to submit database commands including initiate reorganization (full or reference group), pause or stop the reorganization, select reference group, and others. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Netscape Navigator) and return the appropriate HTML or XML responses using network 112. For example, server 102 may receive such an SQL query or reorganization command from client 104 using the web browser and then execute the parsed query to store and/or retrieve information in database 200 or reorganize database 200 as appropriate.

In one aspect of operation, server 102 stores information in and retrieves information from database 200. In a particular implementation, server 102 may initiate operation of database 200 by storing an initial set of rows, such as rows stored in backup records 106, in memory 120 according to the native key sequence. Server 102 then proceeds to process queries from clients 104, during which server 102 may access physical blocks of memory 120 for writing, erasing, and rewriting rows according to a particular DSOP. Server 102 may also track access statistics 114 for reference groups 122 to determine how often and how efficiently information within each reference group 122 is being retrieved. Given that reference groups are often based on data, new reference groups 122 may also be added as more new rows are added to database 200.

As database manager 108 monitors access statistics 114, server 102 may detect a condition indicative of excessive contamination of the key sequence for one or more of reference groups 122, which may be associated with a decline in performance. For example, the average number of rows retrieved per physical I/O within a particular reference group 122 may decrease. Any of the various possible measurements for assessing the performance of database 200 may be generally referred to as "performance metrics." A decline in performance with respect to a particular reference group 122 may also substantially impair the overall performance of server 102 or database 200, particularly when a particular reference group 122 is being accessed relatively often. When the degree of contamination or scarcity is deemed to be sufficiently serious, such as when the average number of rows retrieved per physical I/O for a particular reference group 122 or for the overall database 200 drops below a certain threshold, database manager 108 or an administrator or other user may determine that it would be useful to reorganize one or more reference groups 122 in order to improve performance. In other embodiments, database manager 108 may reorganize reference groups 122 whenever the contamination of the key sequence for that particular reference group 122 reaches a certain level, irrespective of performance effects. For example, if the ratio of total rows stored to physical blocks used drops below a certain number, need for reorganization may be indicated. Still other embodiments allow database manager 108 to generate reports for a user, allowing the user to make a determination as to whether reorganization of reference groups 122 is warranted. These and numerous other possible conditions associated with determining when a reorganization is useful will be referred to as "reorganization conditions." In further embodiments, the administrator or other user may request that database manager 108 perform the reorganization by specifying the table name and the reference group value, such as a certain bank routing number within a checking account table. Based on this identification, database manager 108 accesses each data row within the table by reference groupings. In any event, once a reorganization condition is met or requested, server 102 reorganizes a portion of memory 120 by moving one or more rows in those reference groups 122 into substantively contiguous blocks to place them in order for that group 122.

In reorganizing database 200, database manager 108 may identify rows associated with a particular reference group 122, whether automatically determined or manually selected, and consolidate those rows in order according to the key sequence within a smaller number of physical blocks. The key sequence used to reorganize the rows need not have an exact equivalence with the physical ordering of blocks (the native key sequence). Instead, consolidating reference groups 122 within physical blocks such that the order of those rows corresponds to their order in the key sequence may be used to provide improved performance without the need to reload the entire database 122. Thus, reorganization can be performed during the operation of database 200 similarly to other read and write operations performed in response to queries. Statistics may be collected and a report or other output generated.

Indeed, database manager 108 may reorganize database 200 based on a specified or determined reference group using any appropriate technique. For example, database manager 108 may first determine the "target" blocks. These are those reference group blocks with rows>=the target value and that have available freespace. Next, database manager 108 may determine the "source" blocks, which are those blocks with at least one row in this reference group and not in the target block list. Database manager 108 may then sort the source blocks by least number of reference group rows to largest and sort the target blocks by the most amount of available freespace to the least. Database manager 108 may then move the rows from the "least" source blocks to freespace on the "most freespace" target block. Once that target block is full, database manager 108 identifies the next target block. Database manager 108 may continue the process until there are no more rows for this reference group in the source blocks or the freespace on the target blocks has been expended. Of course, based on a profile or a user request (for example), database manager 108 may also generate a detail line for each reference group showing records moved and, individually or in combination, generate summary report.

In another example, database manager 108 may determine the "target" blocks. In this example, these are those blocks with reference group rows>=the target value and that have available freespace or blocks that have at least one row for this reference group and enough freespace to house additional reference group rows so that the "possibility" content would exceed the target value. Next, database manager 108 determines the "source" blocks, which are those blocks with at least one row in this reference group and not in the target block list. Database manager 108 may then sort the source blocks by least number of reference group rows to largest and sort the target blocks by "possibility" content, then existing reference group rows counts. Target blocks with a lot of free space will typically be favored over target blocks with the most reference group rows; i.e., block 5 with 5 reference group rows and 15 free space possibilities would be selected before block 6 with 10 reference group rows and 1 free space, but after block 3 which has 10 reference group rows and 10 free space possibilities. As with the prior example reorganization technique, database manager 108 continues the process until there are no more rows for this reference group on the source blocks or the freespace on the target blocks has been expended. As well, based on a profile or a user request (for example), database manager 108 may also generate a detail line for each reference group showing records moved and, individually or in combination, generate summary report. Of course, these techniques are for illustration purposes only and any reorganization technique operable to use reference groups, key sets, or other similar data categories may be used without departing from the scope of the disclosure. Indeed, in certain embodiments, database manager 108 may be operable to execute numerous techniques and may select the appropriate one, or a combination thereof, based on the system characteristics and/or user selection.

Certain embodiments may realize a number of technical advantages. An advantage of particular embodiments is that database 200 may be operated without the need to interrupt operation in order to remedy declines in performance associated with contamination of the native key sequence. Another advantage of certain embodiments is that the reorganization process may be divided into a number of individual steps, such as separate erase and write operations. In addition to allowing the reorganization to be more easily worked into the ordinary operation of database 200, such a division also may allow the reorganization to be interrupted, such as by a higher priority operation or a user command, without disrupting the operation of database 200. Certain embodiments may provide a report after the reorganization is complete to provide information such as total number of rows moved, which rows were moved, which blocks were affected, whether the number of blocks used decreased and by how much they decreased, how many reference groups were reorganized, what the effect was on performance, and numerous other pieces of information describing the details and effect of the reorganization process. Of course, particular embodiments may include some, none, or all of the enumerated technical advantages.

Figure 2:
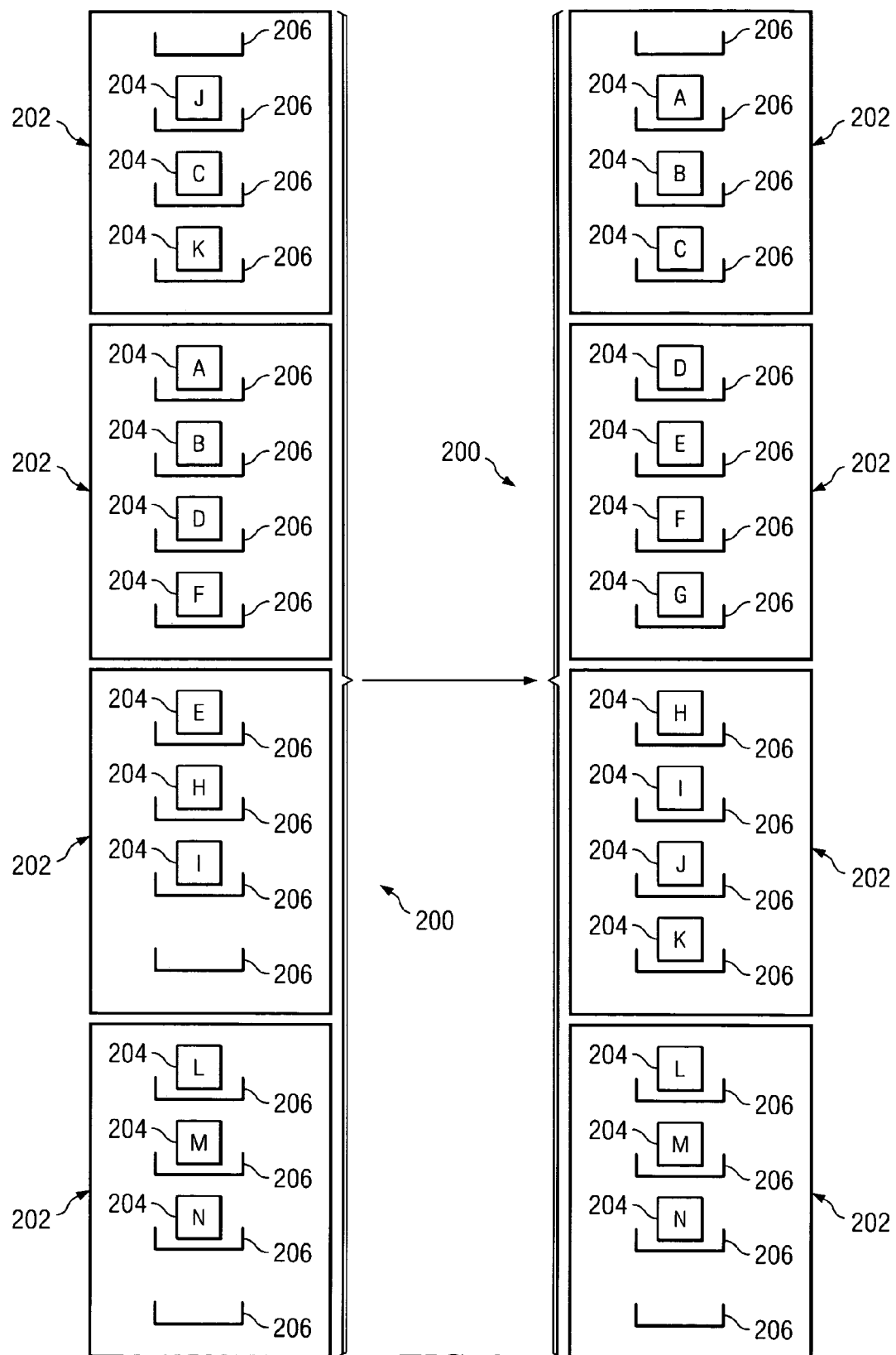
FIG. 2 is a block diagram illustrating a database reorganization operation.

FIG. 2 is a block diagram illustrating a database reorganization operation. In the depicted embodiment, database 200 includes blocks 202 and rows 204 stored within blocks 202. For clarity of illustration, only those rows 204 associated with a particular reference group 122 are illustrated. However, it should be understood that an actual database 200 includes rows 204 from one or more other reference groups 122 stored in blocks 202. The rows 204 are labeled "A," "B," "C," ... "n" to indicate their relative order in the key sequence. There may also be a correspondence between the key sequence and the underlying physical blocks 202 to establish a native key sequence so that, for example, "A" would correspond to a first memory location 206 of the first block 202, "B" would correspond to a second memory location 206 of the first block 202, and so on. For purposes of illustration, each block 202 has memory locations 206 for four rows, but it should be understood that the capacity may in principle be any number.

In the initial state, various rows 204 are stored in separate blocks 202 in an order that does not correspond to the key sequence. In the reorganization, rows 204 are consolidated within blocks 202 in order according to the key sequence. In the illustrated example, all of the stored rows 204 in the particular reference group 122 are reorganized, but in principle, a selected portion of the rows in the reference group 122 could be reorganized. The reorganization may take place in a series of steps in which one or more rows 204 are erased from one block 202 and rewritten in another block 202. Rows 204 from other reference groups 122 may be relocated to other memory locations 206 to make space available as appropriate. Note that in the depicted reorganization, the reorganized rows 204 are rewritten in an order corresponding to the key sequence, but the actual memory locations 206 do not correspond to the memory locations 206 in the native key sequence. Thus, benefits of reorganizing rows 204 sequentially may be realized without requiring specific memory locations 206 to be used in the reorganization.

FIG. 3 illustrates a sample report 300 useable to analyze the degree of contamination from a native sequence in a series of reference groups 122. The first column of report 300 is a list of reference group identifiers 302. The key range 304 indicates the range in the native key sequence included in each reference group 122, and a row count 306 indicates the number of rows 204 in each group 122. The block count 308 represents the number of blocks 202 used to store rows 204 of each reference group 122, and the row-to-block ratio 310 indicates the average number of rows 204 stored in each block 202. Frequency table 312 breaks down the individual blocks 202 used to store rows 204 from each reference group 122 by the number of rows 204 stored in that block 202. Thus, taking the first reference group 122 as an example, the "10-14 rows" column has a "2" value, indicating that two blocks 202 hold at least ten and no more than fourteen rows 204 from the first reference group 122.

Report 300 also provides summary information. For example, the total line 314 provides totals of the previous columns. Report 300 also provides average values for the average row-to-block ratio 316 and the average number of reference group rows per block RFG/BLK) 318. The average row-to-block ratio 316 provides a measure of how efficiently physical blocks are being used to store information overall, while the reference group RFG/BLK value 318 provides an overall indication of how well rows 204 are being consolidated and sequenced. Based on such information, a determination can be made as to whether one or more reference groups 122 should be reorganized, and the information about individual groups may be helpful for determining which reference groups 122 should be reorganized. For example, since the rows 204 of the fifteenth reference group 122 are spread out over a relatively large number of blocks 202 (more than a hundred, in this case), it could be useful to reorganize that group 122 into a smaller number of blocks 202.

Figure 4:
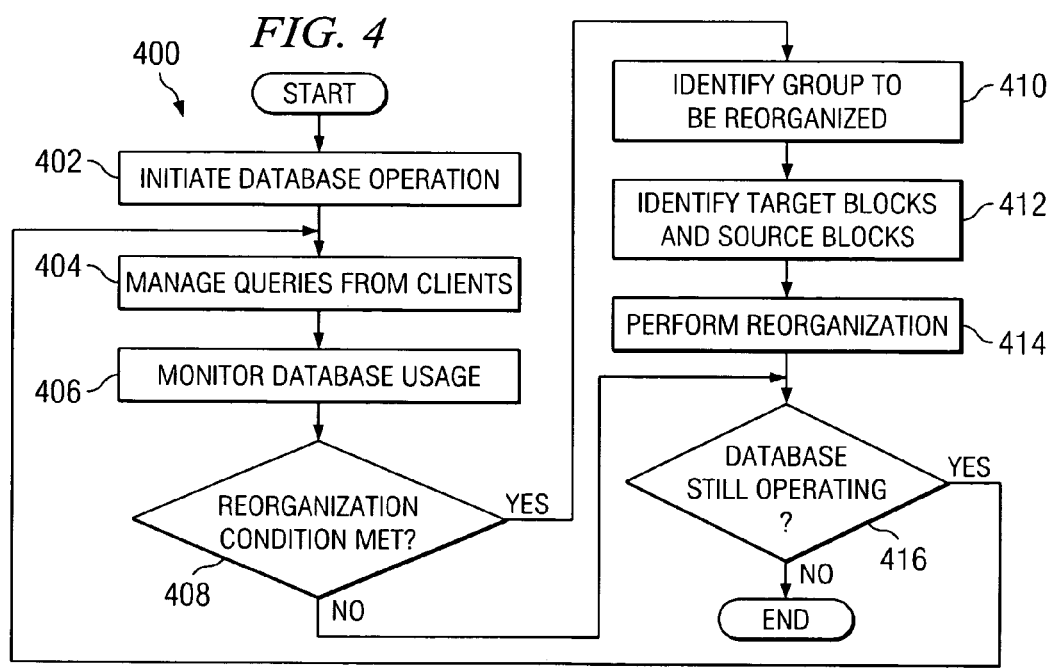
FIG. 4 illustrates an example method for reorganizing a database.

FIG. 4 illustrates an example method 400 for reorganizing a database. Operation of database 200 is initiated at step 402. In this step 402, database 200 may be populated using a predetermined set of records, restored from backup records 106, or similarly created in an initial state. At step 404, server 102 manages queries from clients 104. Such query management may include storing new information, retrieving information, generating replies, and numerous other management tasks. Server 102 also monitors database usage to detect a reorganization condition at step 406. Such monitoring may involve the use of access statistics 114, performance measurements, average value, or any of the numerous other indicators described or suggested above. In particular embodiments, server 102 may report results to a user, and the user may make a determination as to when reorganization should be performed. At decision step 408, a determination is made as to whether a reorganization condition has been met. For example, this could be indicated by a particular degree of contamination in the key sequence, a certain decline in performance, or any other suitable indication detectable by or in response to the monitoring of step 406. If such a condition has not been met, then database operation may be repeated from step 404 until database operation is halted, as shown by decision step 416.

When a reorganization condition is met, database manager 108 identifies reference groups 122 to be reorganized at step 410. In particular embodiments, such a determination may be made based on information about reference groups 122 collected at step 406. Database manager 108 identifies target rows 204 to be moved and target blocks 202 to which the target rows 204 will be moved at step 412. As part of this step 412, database manager 108 may identify rows 204 from other reference groups 122 currently stored in target blocks 202 that may need to be moves elsewhere in memory 120. Database manager 108 then performs the reorganization at step 414. This step 414 may be performed as a series of substeps, such as read and writes of individual rows 204, that can be integrated with the flow of query process. Such a series of substeps may be able to be interrupted before the entire reorganization is complete. As shown by decisional step 416, the method may be repeated from step 404 for as long as database 200 remains in operation, online, or otherwise active.

The preceding flowchart 400 and accompanying description illustrates an example method, but numerous other similar or distinct methods could be employed or implemented as well. Accordingly, many of the steps in this flowchart may take place simultaneously and/or in different orders than as shown. Moreover, other methods with additional steps, fewer steps, and/or different steps may be employed. In particular, any method of operation suitable for use with any of the embodiments of environment 100, server 102, database manager 108 or database 200 described herein is contemplated within this disclosure. Generally, methods that are consistent with any of the techniques for reorganizing a database described or suggested by this disclosure may be employed.

Although this disclosure has been described in terms of certain embodiments and generally associated methods, alterations and permutations of these embodiments and methods will be apparent to those skilled in the art. For example, the techniques may be used in database management systems other than server-client architectures. In another example, various techniques for database reorganization may employ numerous other criteria for identifying when a reorganization should be performed and which reference groups should be reorganized. In yet another example, database 200 may be an object-oriented database (or other data organization) that is operable to be partially reorganized based on class or other category of data. Other changes, substitutions, and alterations are also possible without departing from the spirit and scope of this disclosure, and such changes, substitutions, and alterations may be included within the scope of the claims included herewith.

What is claimed is:

1. A method for reorganizing at least a portion of a database, the portion of the database comprising one or more reference groups, each of which include a plurality of rows stored in a plurality of physical blocks, comprising:
   identifying a target subset of physical blocks for at least one of the reference groups, each block in the target subset having available freespace and storing a plurality of the rows in the at least one reference group;
   identifying a source subset of physical blocks for the at least one reference group, each block in the source subset storing at least one of the plurality of rows in the at least one reference group; and
   dynamically moving the rows in the at least one reference group stored in the source subset of physical blocks to the freespace in the target subset of physical blocks while the database is online, wherein dynamically moving the rows includes:
      sorting the identified target subset of physical blocks according to an amount of available freespace in each particular target physical block;
      sorting the identified source subset of physical blocks according to a number of rows in the reference group stored in each particular source physical block; and
      dynamically selecting the rows to be moved from the source subset of physical blocks to the target subset of physical blocks based on the sorting of the target and source subsets of physical blocks.

2. The method of claim 1, wherein dynamically moving the rows further includes:
   selecting one of the sorted source subset of physical blocks that stores a smallest number of rows in the reference group;
   selecting one of the sorted target subset of physical blocks that has a greatest amount of available freespace; and
   dynamically moving the rows in the at least one reference group stored in the selected source physical block to the freespace in the selected target physical block.

3. The method of claim 1, further comprising identifying the reference group for reorganization based on a user request.

4. The method of claim 1, further comprising automatically determining that the reference group should be reorganized based on one or more performance metrics.

5. The method of claim 4, one of the performance metrics comprising an average number of rows retrieved per physical access for the reference group.

6. The method of claim 4, further comprising:
   measuring the performance metric again after moving the rows stored in the source subset of physical blocks to the freespace in the target subset of physical blocks; and
   generating a report indicative of any change in the performance metric after the performance metric has been measured again.

7. The method of claim 1, wherein:
   identifying the target subset of physical blocks comprises identifying physical blocks storing a number of rows in the at least one reference group that equals or exceeds a target value; and
   identifying the source subset of physical blocks comprises identifying physical blocks including at least one of the plurality of rows in the reference group and which are distinct from the physical blocks in the target subset.

8. A database management system, comprising:
   a memory storing at least a portion of a database, the portion of the database comprising one or more reference groups, each of which include a plurality of rows stored in a plurality of physical blocks; and
   one or more processors configured to:
      identify a target subset of the physical blocks for at least one of the reference groups, each block in the target subset having available freespace and storing a plurality of the rows in the at least one reference group;
      identify a source subset of the physical blocks for the at least one reference group, each block in the source subset storing at least one of the plurality of rows in the at least one reference group; and
      dynamically move the rows in the at least one reference group stored in the source subset of physical blocks to the freespace in the target subset of physical blocks while the database is online, wherein dynamically moving the rows includes:
         sorting the identified target subset of physical blocks according to an amount of available freespace in each particular target physical block;
         sorting the identified source subset of physical blocks according to a number of rows in the reference group stored in each particular source physical block; and
         dynamically selecting the rows to be moved from the source subset of physical blocks to the target subset of physical blocks based on the sorting of the target and source subsets of physical blocks.

9. The system of claim 8, wherein dynamically moving the rows further includes:
   selecting one of the sorted source subset of physical blocks that stores a smallest number of rows in the reference group;
   selecting one of the sorted target subset of physical blocks that has a greatest amount of available freespace; and
   dynamically moving the rows in the at least one reference group stored in the selected source physical block to the freespace in the selected target physical block.

10. The system of claim 8, the one or more processors further configured to identify the reference group for reorganization based on a user request.

11. The system of claim 8, the one or more processors further configured to automatically determine that the reference group should be reorganized based on one or more performance metrics.

12. The system of claim 11, one of the performance metrics comprising an average number of rows retrieved per query for the reference group.

13. The system of claim 11, the one or more processors further configured to:
   measure the performance metric again after moving the rows stored in the source subset of physical blocks to the freespace in the target subset of physical blocks; and
   generate a report indicative of any change in the performance metric after the performance metric has been measured again.

14. The system of claim 8, wherein the one or more processors further configured to:
   identify the target subset of physical blocks by identifying physical blocks storing a number of rows in the at least one reference group that equals or exceeds a target value; and
   identify the source subset of physical blocks by identifying physical blocks including at least one of the plurality of rows in the reference group and which are distinct from the physical blocks in the target subset.

15. A computer readable storage medium including computer-executable instructions thereon for reorganizing at least a portion of a database, the portion of the database comprising one or more reference groups, each of which include a plurality of rows stored in a plurality of physical blocks, wherein a computing device that executes the computer-executable instructions is configured to:

identify a target subset of physical blocks for at least one of the reference groups, each block in the target subset having available freespace and storing a plurality of the rows in the at least one reference group;

identify a source subset of physical blocks for the at least one reference group, each block in the source subset storing at least one of the plurality of rows in the at least one reference group; and dynamically move the rows in the at least one reference group stored in the source subset of physical blocks to the freespace in the target subset of physical blocks while the database is online, wherein dynamically moving the rows includes:

sorting the identified target subset of physical blocks according to an amount of available freespace in each particular target physical block;

sorting the identified source subset of physical blocks according to a number of rows in the reference group stored in each particular source physical block; and dynamically selecting the rows to be moved from the source subset of physical blocks to the target subset of physical blocks based on the sorting of the target and source subsets of physical blocks.

16. The computer readable storage medium of claim 15, wherein dynamically moving the rows further includes:

selecting one of the sorted source subset of physical blocks that stores a smallest number of rows in the reference group;

selecting one of the sorted target subset of physical blocks that has a greatest amount of available freespace; and dynamically moving the rows in the at least one reference group stored in the selected source physical block to the freespace in the selected target physical block.

17. The computer readable storage medium of claim 15, wherein the computing device that executes the computer-executable instructions is further configured to identify the reference group for reorganization based on a user request.

18. The computer readable storage medium of claim 15, wherein the computing device that executes the computer-executable instructions is further configured to automatically determine that the reference group should be reorganized based on one or more performance metrics.

19. The computer readable storage medium of claim 18, one of the performance metrics comprising an average number of rows retrieved per query measured for the entire database.

20. The computer readable storage medium of claim 18, one of the performance metrics comprising an average number of rows retrieved per physical access for a particular reference group.

21. The computer readable storage medium of claim 18, wherein the computing device that executes the computer-executable instructions is further configured to:

measure at least one of the performance metrics again after moving the rows stored in the source subset of physical blocks to the freespace in the target subset of physical blocks; and generate a report indicative of any change in the particular performance metric after the performance metric has been measured again.

22. The computer readable storage medium of claim 15, wherein the computing device that executes the computer-executable instructions is further configured to:

identify the target subset of physical blocks by identifying physical blocks storing a number of rows in the at least one reference group that equals or exceeds a target value; and identify the source subset of physical blocks by identifying physical blocks including at least one of the plurality of rows in the reference group and which are distinct from the physical blocks in the target subset.

23. The computer readable storage medium of claim 15, wherein the computing device that executes the computer-executable instructions is further configured to:

receive a query from a client, the query associated with a row in the portion of the database; and execute the query on the particular row while the rows stored in the source subset are dynamically moved to the freespace in the target subset.

24. A method for at least partially correcting contamination of a reference group in a database, the contaminated reference group including a plurality of rows stored in a plurality of physical blocks, comprising:

identifying a key sequence for the plurality of rows in the contaminated reference group, the key sequence defining an index for the plurality of rows in the database;

monitoring access statistics for the contaminated reference group to detect an occurrence of at least one reorganization condition indicating that the contaminated reference group needs to be reorganized; and reorganizing the plurality of rows in the contaminated reference group according to the key sequence when the reorganization condition occurs, wherein reorganizing the plurality of rows includes dynamically moving one or more of the plurality of rows from a source physical block to freespace in a target physical block while the database is online, wherein dynamically moving rows includes:

selecting one of the plurality of physical blocks that stores a smallest number of rows in the contaminated reference group to be the source physical block;

selecting one of the plurality of physical blocks that has a greatest amount of available freespace to be the target physical block; and dynamically moving the rows in the at least one reference group stored in the source physical block to the freespace in the target physical block.

25. The method of claim 24, the reorganization condition for the particular reference group comprising a number of rows retrieved per query of the reference group being below a predetermined threshold.

26. The method of claim 24, the reorganization condition for the particular reference group comprising an average number of rows stored per query being below a predetermined threshold.

* * * * *